(12) United States Patent
Bigolin et al.

(10) Patent No.: US 11,904,967 B2
(45) Date of Patent: Feb. 20, 2024

(54) MOULD FOR A SUPPORT ELEMENT FOR THE HUMAN BODY, SUCH AS A SADDLE

(71) Applicant: Selle Royal S.p.A., Pozzoleone (IT)

(72) Inventors: Barbara Bigolin, Vizenza (IT); Marco Malfatti, Vizenza (IT)

(73) Assignee: SELLE ROYAL S.P.A., Pozzoleone (IT)

( * ) Notice: Subject to any disclaimer, the term of this patent is extended or adjusted under 35 U.S.C. 154(b) by 654 days.

(21) Appl. No.: 16/629,409

(22) PCT Filed: Jun. 25, 2018

(86) PCT No.: PCT/IB2018/054664
§ 371 (c)(1),
(2) Date: Jan. 8, 2020

(87) PCT Pub. No.: WO2019/012356
PCT Pub. Date: Jan. 17, 2019

(65) Prior Publication Data
US 2020/0180717 A1    Jun. 11, 2020

(30) Foreign Application Priority Data

Jul. 10, 2017 (IT) .................. 102017000077584

(51) Int. Cl.
*B29C 33/18* (2006.01)
*B29C 33/26* (2006.01)
(Continued)

(52) U.S. Cl.
CPC ................. *B62J 1/18* (2013.01); *B29C 33/18* (2013.01); *B29C 33/26* (2013.01); *B29C 39/34* (2013.01);
(Continued)

(58) Field of Classification Search
CPC ... B29C 39/34; B29C 43/42; B29C 2043/425; B29C 44/582
See application file for complete search history.

(56) References Cited

U.S. PATENT DOCUMENTS 5,441,676 A  *  8/1995  Bigolin .................. B29C 44/12
                                                      264/318

FOREIGN PATENT DOCUMENTS

NO     2007/020571     2/2007
WO     2007/088495     8/2007

OTHER PUBLICATIONS

Description of WO 2007/088495 with Line Numbers (Year: 2007).*
International Search Report for PCT/IB2018/054664 dated Sep. 14, 2018 (2 pages).

* cited by examiner

*Primary Examiner* — Xiao S Zhao
*Assistant Examiner* — John J DeRusso
(74) *Attorney, Agent, or Firm* — Tutunjian & Bitetto, P.C.

(57) ABSTRACT

Mould for making a support element for the human body, such as a bicycle saddle or a motorcycle saddle, wherein the mould includes a first component or matrix, which is provided with a cavity open at the top, and at least one second component or false-male, in which the second component or false-male has a through opening, the cavity of the first component or matrix and the through opening of the second component or false-male determine a cavity, which has a conformation in use matching the conformation and/or the bulk and/or to the outer surface of the support element for the human body or the saddle; method for obtaining the support element for the human body and support element for the human body.

10 Claims, 5 Drawing Sheets

(51) Int. Cl.
    *B29C 44/58*         (2006.01)
    *B29C 39/34*         (2006.01)
    *B29L 31/30*         (2006.01)
    *B62J 1/18*          (2006.01)
    *B29C 44/12*         (2006.01)
    *B29C 44/40*         (2006.01)
    *B29C 44/42*         (2006.01)
    *B29K 675/00*       (2006.01)
    *B29K 75/00*         (2006.01)

(52) U.S. Cl.
    CPC .......... *B29C 44/1257* (2013.01); *B29C 44/58* (2013.01); *B29C 44/582* (2013.01); *B29C 44/40* (2013.01); *B29C 44/42* (2013.01); *B29K 2075/00* (2013.01); *B29K 2675/00* (2013.01); *B29K 2713/00* (2013.01); *B29L 2031/3094* (2013.01)

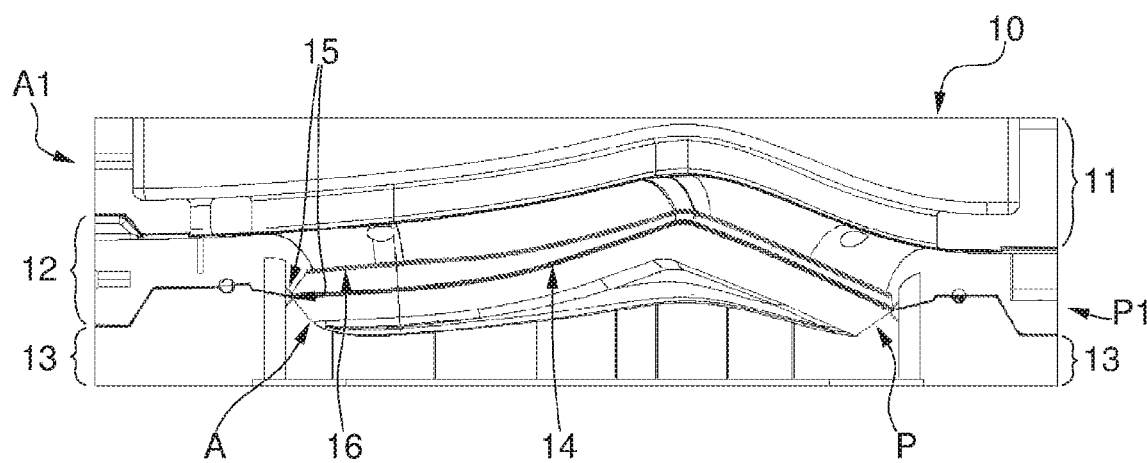
FIG. 1
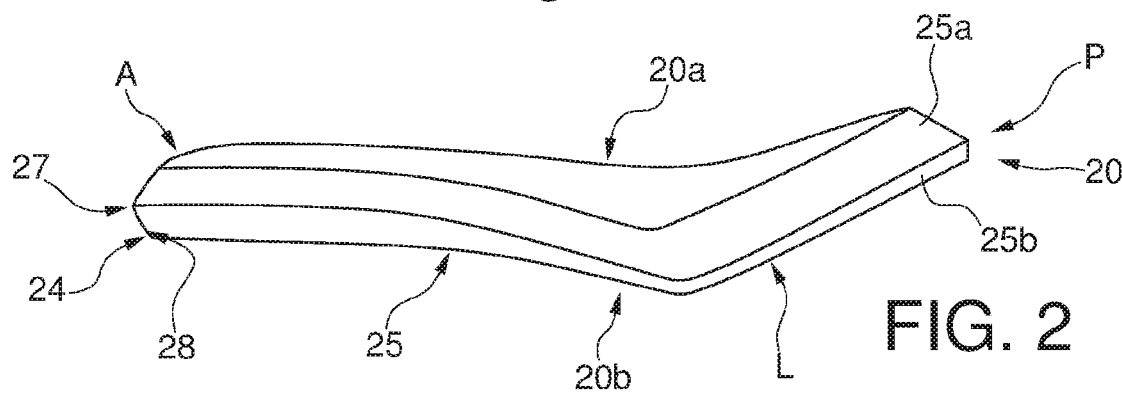
FIG. 2
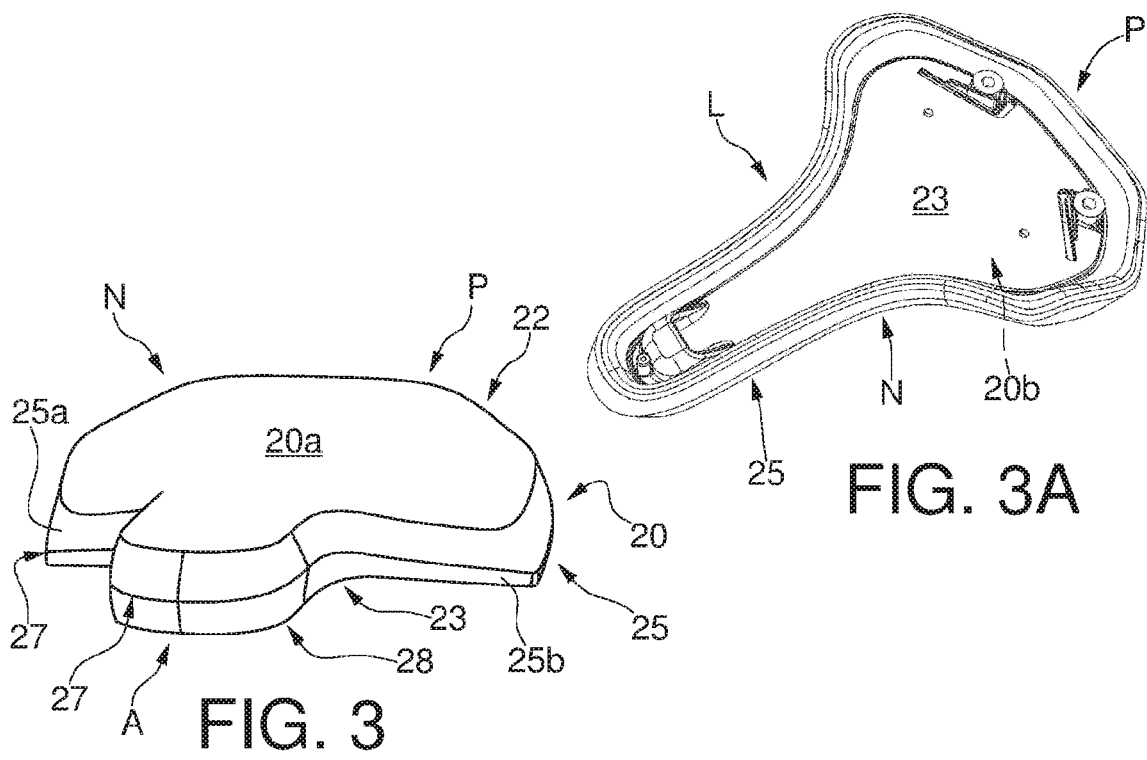
FIG. 3A
FIG. 3

US 11,904,967 B2

MOULD FOR A SUPPORT ELEMENT FOR THE HUMAN BODY, SUCH AS A SADDLE

TECHNICAL FIELD OF THE INVENTION

The present invention relates to a mould for a support element for the human body, such as a saddle for vehicles in general, for example bicycles or motorcycles. In particular, the present invention relates to a mould provided with negative drafts, able to produce, in the support element, possible undercuts or drafts variously sharp-cornered or angular.

PRIOR STATE OF THE ART

The traditional moulds for the construction of saddles for vehicles, in particular for bicycles, do not have undercuts in their female part, and this to allow the extraction from the mould of the object, once the same has been formed.

In this way, however, the saddle resulting from the use of this type of mould has a rounded side edge, substantially along the whole profile of the saddle, including its front area or tip (nose).

Therefore, there is the need to have a mould that allows the realization of supports for the human body, such as saddles for vehicles, equipped with more complex conformations, possibly provided with edges having undercuts and sharp-cornered or angular profiles.

SUMMARY OF THE INVENTION

An object of the present invention is to provide a mould for a support element for the human body, such as a saddle for vehicles, in particular bicycles or motorcycles, which overcomes the drawbacks of the prior art.

Another object of the present invention is to provide a mould for making a support element for the human body that is simple and versatile.

Another object of the present invention is to provide a mould for making a support element for the human body having complex conformations, optionally provided with undercuts or angular edges.

According to an aspect of the invention, a mould is provided for the realization of a support element for the human body, such as for example a saddle for vehicles, according to the present application.

A further object of the present invention is to provide a method for making a support element for the human body, which uses the mould according to the present invention.

Another object of the present invention is to provide a method for making a support element for the human body that is simple and cost-effective, and at the same time allows to obtain even complex geometries in the resulting support for the human body.

According to an aspect of the invention, a method is provided for the realization of a support element for the human body, such as for example a saddle for vehicles, according to the present application.

Furthermore, an object of the present invention is to provide a support element for the human body having a new lateral or perimetric conformation, as indicated according to the present application The present application refers to preferred and advantageous examples of embodiments of the invention.

BRIEF DESCRIPTION OF THE DRAWINGS

Other features and advantages of the invention will be more evident from the description of embodiment examples of a mould for making a support element for the human body, such as a saddle for vehicles, illustrated by way of example in the accompanying drawings wherein:

FIG. 1 is a partially transparent side view of a mould for the realization of a support for the human body according to the present invention, FIG. 2 is a side view of a saddle for vehicles made by means of the mould of FIG. 1, FIG. 3 is a front perspective view of the saddle for vehicles of FIG. 2;

FIG. 3A is a front perspective view of the lower part of the saddle as shown in FIG. 3.

In the accompanying drawings, identical parts or components are distinguished by the same reference numerals.

DETAILED DESCRIPTION

Figure 4:
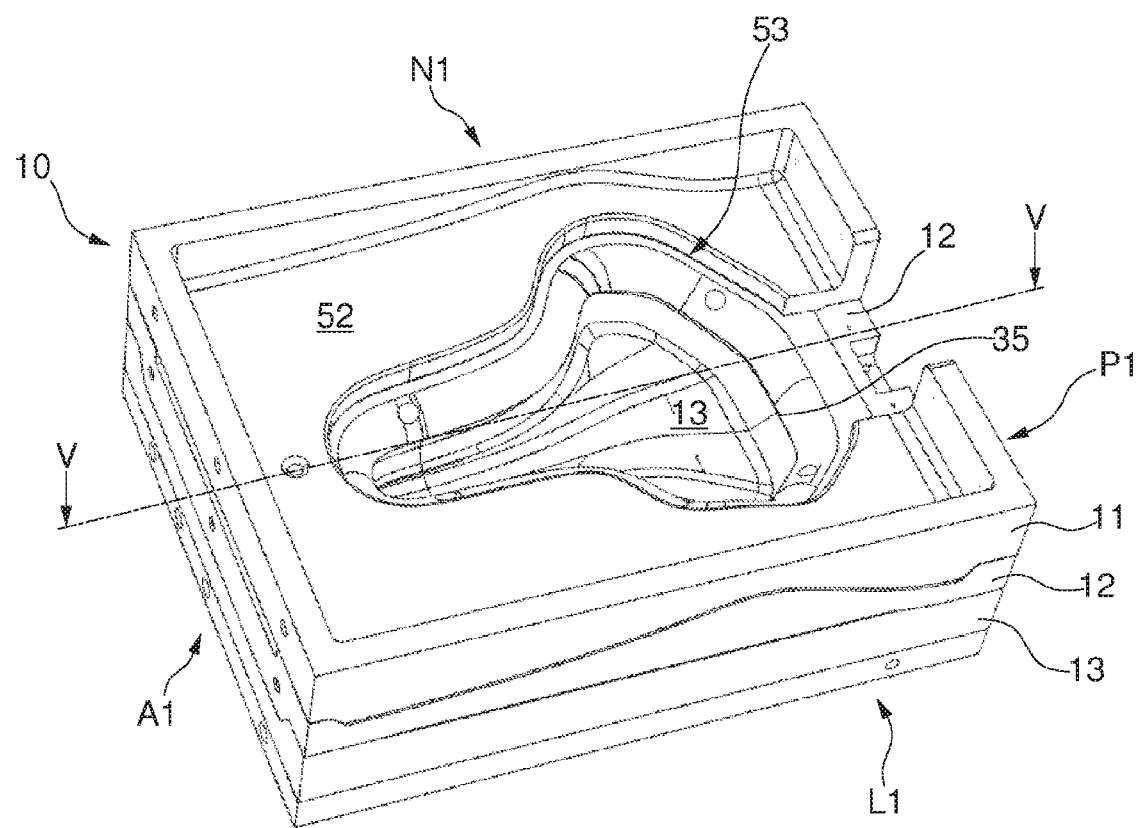
FIG. 4 is a perspective view of the mould according to the present invention.

With reference to FIG. 1, the mould 10 according to the present invention is illustrated, for the realization of a support for the human body, such as for example a saddle for vehicles.

In the remainder of the present discussion, and in the tables of the accompanying drawings, reference will be made to a bicycle saddle 20, but it remains confirmed that the mould according to the present invention relates to an element for supporting the human body, such as a saddle for vehicles in general or, more in detail, a saddle for bicycles or motorcycles, etc.

Said saddle 20 comprises a cover 21, a padding 22 and a frame or shell 23.

The cover 21 is the outermost layer of the saddle 20, suitable during use for coming into contact with the user.

The cover 21 is made of a flexible and thin material; it is obtained from a section or a piece of such material, as it will be better described in the following.

The material constituting the cover 21 may be a fabric, a natural fabric, a non-woven fabric, a polymeric material, polyvinylchloride, leather, a polyurethane film, a synthetic or natural plastic or polymeric material, etc.

The padding 22 is the part of the saddle 20 which determines the comfort and the support for the user and can be made of at least one material, such as for example a first expandable material, such as a foam, and in a second material, such as a gel.

The padding 22, according to at least one version of the invention, is made—at least in part—in a material capable of expanding, such as a polymeric resin, an elastomeric material, a foam or a polyurethane foam.

Finally, the frame or shell 23 is the support component of the saddle, designed to guarantee the support of the user during use. The frame or shell 23 can be adapted to connect the saddle 20 to the bicycle frame, for example in particular to the seatpost.

The frame or shell 23 is usually made of a rigid or semi-rigid plastic material.

The padding 22 is placed between the cover 21 and the frame or shell 23 and, at least in a version of the invention, is bound to the latter or both.

According to the present description, a longitudinal direction or longitudinal axis means a direction or an axis extending from the front part A1 of the mould or from the front part (tip) A of the saddle 20 to the rear part P1 of the mould or to the rear part P of the saddle 20.

Transverse direction or axis means a direction or an axis perpendicular to the longitudinal direction or axis, which goes from side to side L1, N1 of the mould 10 or from side to side L, N of the saddle 20.

A longitudinal plane means a plane of symmetry of the saddle 20, which passes from its front part A to its rear part P, cutting the saddle 20 into two equal halves.

There will be a similar arrangement for a longitudinal plane of the mould 10.

A transverse plane means a plane perpendicular to the longitudinal plane, passing from side to side L, N of the saddle 20, cutting the latter into a front part and a rear part.

A similar arrangement will take place for a transversal plane of the mould 10.

Vertical means a direction that goes from the bottom to the top or from the top to the bottom, substantially perpendicularly to the ground.

The upper part of the saddle 20 refers to a portion of the saddle which in use faces upwards or towards the user. The lower part of the saddle 20 refers to a portion of the saddle which in use faces towards the ground or the frame of the bicycle, therefore opposite to the part on which the user rests.

Since the mould 10 which serves for the construction of the saddle 20 has an inverted negative conformation of the latter, the upper part of the saddle is moulded from the lower part of the mould 10 and vice versa.

The saddle 20 also has an edge portion 25. The edge portion 25, as visible in FIGS. 2 and 3, has a substantially annular shape and follows the conformation of the perimeter of the saddle 20.

With respect to the upper portion or surface 20a of the saddle 20, which extends substantially along a horizontal plane substantially parallel to the ground, the edge portion 25 extends along a substantially vertical plane, that is to say in use substantially perpendicular to the ground.

As can be seen in FIG. 2, in profile view, the upper portion or surface 20a of the saddle 20 has a substantially flattened or recessed pattern with respect to the ground. The edge portion 25 has lateral surfaces placed respectively along the sides L, N of the saddle 20, having a substantially C-shaped conformation, one opposed to the other.

The edge portion 25 has a front surface, located at the front portion or tip (nose) A of the saddle 20, having a substantially U-shaped conformation.

Finally, the edge portion 25 has a rear surface, located at the rear portion P of the saddle 20, having a substantially curved conformation.

Lastly, the saddle 20 has a lower portion or surface 20b, in use facing the saddle frame, and opposite to the upper surface of the saddle 20. The lower portion or surface 20b is adapted to be engaged by the frame or shell 23 of the saddle 20.

Therefore, the edge portion 25 extends substantially from the lower surface 20b to the upper surface 20a of the saddle 20.

Again, the outer surface of the saddle 20 means its upper surface 20a and at least part of its edge portion 25.

The mould 10 according to the present invention comprises a first component or matrix 13, which is provided with a cavity 33 which reproduces part of the outer surface of the saddle 20. In particular, the cavity 33 reproduces in negative the upper portion 20a and at least part of the edge portion 25 of the saddle 20.

The mould therefore comprises a second component or false-male 12, adapted to be superimposed on the first component or matrix 13, provided with an opening 43 substantially corresponding in plan to the shape of the cavity 33 of the first component or matrix 13.

Finally, there is a third component or cover-press 11, able to lock in position the cover 21 of the saddle 20 on the second component 12.

The joining of the first component 13 and of the second component 12, and possibly of the third component 11, forms the female part of the mould 10.

The mould 10 according to the present invention is designed in order to overcome the drawbacks of the moulds of known type. In particular, as said, the mould 10 according to the present invention allows to realize negative draft angles on the support element for the human body, such as the saddle 20. Such negative draft angles were unachievable with other moulds because they resulted—until now—in undercuts that would not allow the exit of the support element for the human body from the mould, once its moulding was completed. This realization limit resulted in an aesthetic and/or comfort limit for the conformation of the resulting product, such as for example for the conformation of the peripheral edge of a saddle for vehicles.

In the mould 10 according to the present invention, the closing line of the mould, indicated with 14 in FIG. 1, does not coincide with the trimming perimeter or edge 16 of the saddle 20, or of the cover of the saddle in particular.

The closing line 14 of the mould 10, therefore, has been moved to a different point of the mould, as will be better explained in the following.

In this way, the shape of the saddle, that is to say its three-dimensional conformation, is determined by the conformation of a respective cavity obtained in and determined by several components of the female part of a mould, as will become more evident in the remainder.

Thanks to the mould 10 according to the present invention, therefore, it is possible to obtain a support element for the human body, or for example a bicycle saddle 20, having a complex or angular conformation, for example having a peripheral side edge and/or an edge portion in the front part of the saddle, equipped with undercuts or negative drafts, also being able, in an easy way, to extract the finished product from the relative mould, simply moving the mould components which determine the shape of the saddle itself away from each other.

Moreover, during the realization step of the mould 10, it is possible to produce sharp corners around the closing line 14 of the mould 10, which are then responsible for the relative undercuts or angular edges of the saddle 20, for example through machining with numerical control or CNC machines.

Such portions with sharp edges, if realized with the traditional methods, should be radiated because of the feasibility limits during the milling step.

The mould 10 according to the present invention, thanks to its special conformation, provides holes 15 for the vacuum which are present both in the first component or matrix 13 and in the second component or false-male 12. In this way, it is possible to absorb or adhere more efficiently the cover 21 in the mould 10, increasing the accuracy of the copying, by the cover itself, of the cavity present in the female part of the mould 10.

The holes 15 for the vacuum, therefore, are adapted to hold the cover in place on the surface of the cavity and to conform it perfectly and permanently according to the shape of the same.

The holes 15 for the vacuum are connected, through suitable channels or connectors, to a vacuum pump, not shown in the accompanying figures.

Figure 5:
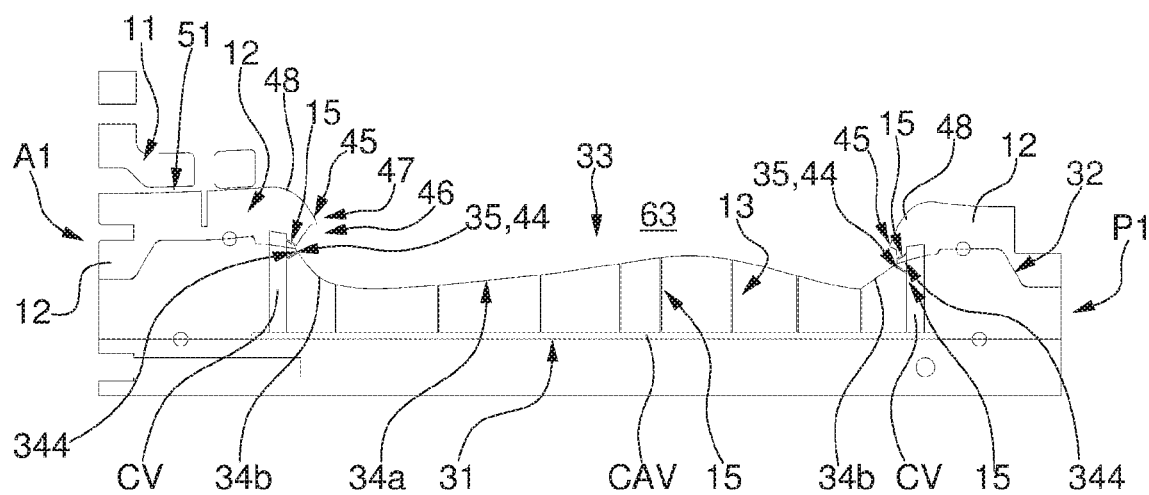
FIG. 5 is a longitudinal sectional view taken along section line V-V of FIG. 4.

For example, as visible for example in FIG. 5, at least two channels or connectors CV for the vacuum are present on the sides of the cavity of the mould 10.

The vacuum connectors connect, on one side, the vacuum pump and, on the other side, the holes 15 for the vacuum. In particular, the holes 15 for the vacuum and the channels or connectors CV are connected to a chamber CAV (visible for example in FIG. 5) made watertight by suitable gaskets, this chamber being in turn connected to an outer vacuum pump. The holes 15 for the vacuum, as is known, have a decimal diameter, i.e. in the order of one tenth of a millimetre.

As can be seen in FIG. 2, thanks to the mould 10 according to the present invention, the saddle 20 has, at least its front portion or tip (nose) A, an undercut 24, which cannot be obtained with the traditional moulds. The undercut 24 is present, for example at least in the front portion of the edge 25 of the saddle 20. However, according to a version of the invention, said undercut 24 can also continue in other areas of the edge 25 of the saddle 20, up to its entire perimetric extension.

Similarly, as can be seen in FIG. 3, the edge portion 25 of the saddle 20 has a sharp-cornered or angular conformation, which is also not feasible with conventional moulds. This sharp-cornered or angular conformation is placed along the perimeter of the saddle 20 in a central position, that is to say at the edge portion 25 placed centrally and/or substantially equidistant from the surface 20a and the lower surface 20b of the saddle 20.

The edge 25 may have along the entire perimeter of the saddle 20 the same angle or conformation. Alternatively, this conformation may vary from area to area.

For example, as shown in FIG. 2, the angle of the edge portion 25 may be more accentuated in the front area or tip (nose) A, gradually reducing through the side portions of the edge 25, until reaching the lowest angle in the rear portion of the edge 25.

As can be seen in the respective figures, in fact, the edge portion 25 has at least two parts: a first edge portion 25a, which departs from the upper surface 20a of the saddle 20.

This first edge portion 25a, having an annular conformation, extends away from the upper surface 20a and/or in use is directed towards the outside and the bottom. The first edge portion 25a, therefore, has a section (evaluated in the horizontal plane during use) increasing away from the upper surface 20a of the saddle 20.

Considering the plane on which the upper surface 20a of the saddle 20 lies, the first edge portion 25a has a slope which forms inside, with the upper surface 20a, an obtuse angle between 90° and 180° or preferably between 100° and 170° or between 120° and 160°.

The edge portion 25 comprises a second edge portion 25b, which departs from the first edge portion 25a.

The contour 27 connects and puts into contact the first edge portion 25a and the second edge portion 25b. The contour 27 determines the sharpest part of the edge portion 25.

The second edge portion 25b has an opposite slope with respect to that of the first edge portion, therefore, while the latter extends downwards outwardly, the second edge portion 25b extends downwards and towards the inside of the saddle 20.

Considering the plane on which the upper surface 20a of the saddle 20 lies, the second edge portion 25b has a slope which forms inside, with the upper surface 20a, an acute angle between 90° and 1° or preferably between 89° and 20° or between 6° and 40°.

As visible, for example, in images 4 and 5, the third component or cover-press 11 is the outermost component of the mould 10, the first component or matrix is the component at the base or which rests on a basic component and/or support of the mould 10 and the second component or false-male 12 is interposed between the third component or cover-press 11 and the first component or matrix 13.

These three components are vertically aligned so as to be substantially coaxial. As can be seen, for example, in FIG. 5, the second component or false-male 12 and the first component or matrix 13 determine, when they are coupled on each other, a cavity open at the top and corresponding at least to the space occupied by the padding 22 of the saddle 20 or its bulk. Thus, the cavity 63 has an inner surface corresponding to the outer surface of the saddle 20. Thus, the inner surface of the cavity 63 is given by the upper surface 20a of the saddle 20 and by the surface of its edge portion 25.

A further component or male 60 of the mould 10 is, for example, illustrated in FIG. 11 and will be described in greater detail hereinafter.

The further component or male 60 closes the upper inlet opening of the cavity 63. In particular, the first component or matrix 13 has a substantially continuous plate conformation, provided with a base surface 31 and an upper surface 32, opposite to the base surface 31. During use, the base surface is positioned below with respect to the upper surface 32.

The upper surface 32 has a portion (peripheral or outermost) having a substantially flattened conformation and has, in a central part thereof, a recessed surface shaped in such a way as to determine a cavity 33. The cavity 33 is open in use upward and at least partially reproduces the shape of the saddle 20 and/or of its padding 22. The conformation of the cavity 33 therefore corresponds at least partially to the contact surface with the user of the saddle 20 and, therefore, to the upper surface 20a and at least part of the edge portion 25 of the cover 21 and/or of the saddle 20.

As can be seen from the section of FIG. 5, the cavity 33 has a first stretch 34a having a substantially flattened conformation or having a convexity facing the inside of the cavity 33 and/or upwards and/or towards the upper surface 32 of the first component or matrix 13. The first stretch 34a is placed in a substantially central position of the cavity 33.

The first stretch 34a substantially corresponds to the one which will result, after the moulding of the saddle 20, of the upper surface 20a of the latter.

Moreover, the cavity 33 has a second stretch 34b which extends radially from the first stretch 34a, away from the latter. The second stretch 34b rises towards the outside of the mould 10 and/or of the cavity 33. The second stretch 34b connects the first stretch 34a and the substantially flattened portion of the upper surface 32.

Therefore, the inner surface which constitutes the cavity 33, given by its first stretch 34a and by its second stretch 34b is substantially outwardly radiated. In this way, no undercuts are created and/or the surface of the cavity 33 is completely turned outwards.

The second stretch 34b corresponds to what will be, after the shaping of the saddle 20, the first edge portion 25a or at least a part of the edge portion 25 of the latter.

Therefore, the slope of the second stretch 34b corresponds to the angle of the first edge portion 25a of the edge portion 25. Therefore, considering the plane on which the first stretch 34a of the cavity 33 lies, the second stretch 34b has a slope which forms inside, with the first stretch 34a, an obtuse angle between 90° and 180° or preferably between 100° and 170° or between 120° and 160°.

At least along part or along the entire surface of the cavity 33 of the matrix 13 there are the holes 15 for the vacuum, the purpose of which will be better described in the following.

The cavity 33 is delimited by a substantially circular perimeter 35. The perimeter 35 is a perimeter of separation of the second stretch 34b with the flattened portion of the upper surface 32. Furthermore, the perimeter 35 substantially corresponds to the contour 27 of the saddle 20 (shown in FIGS. 2 and 3).

Figure 6:
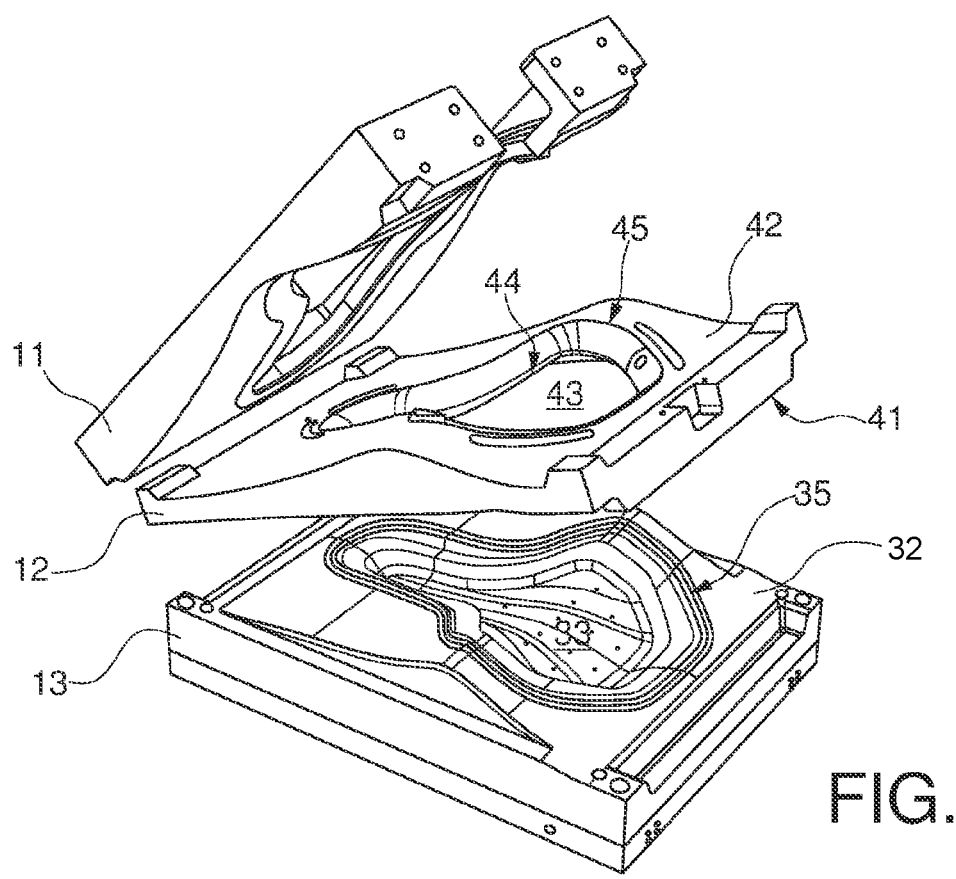
FIG. 6 is a perspective view of a mould according to the present invention according to an open operating position, in which its components are spaced from one another for most of their extension.
Figure 7:
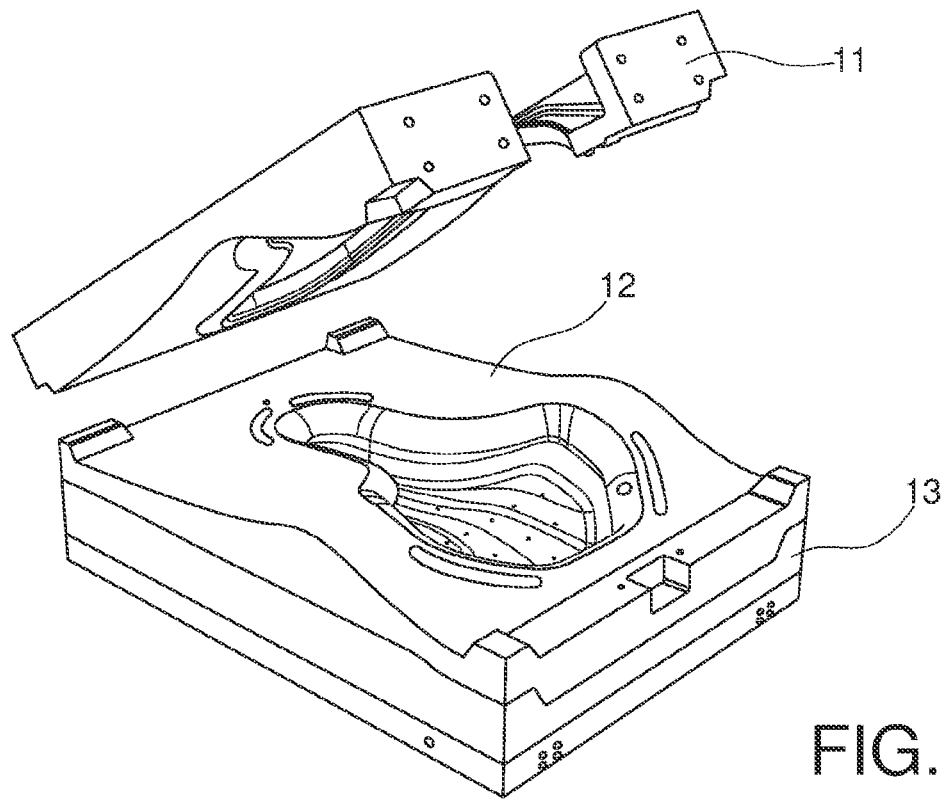
FIG. 7 is a perspective view of the mould of FIG. 6, in which a first and a second component of the mould are assembled one on the other, FIG. 8 corresponds to FIG. 7 and illustrates a process step according to the present invention.

The second component or false-male 12 has a substantially annular plate conformation, provided with a through opening 43 (indicated for example in FIG. 6). The second component or false-male 12 has a base surface 41 and an upper surface 42, opposite the base surface 41. The base surface 41 is positioned in contact with the substantially flattened portion of the surface 32 of the first component or matrix 13.

The upper surface 42 is positioned above the base surface 41 during use.

The through opening 43 determines a lower edge or recess 44. This lower edge or recess 44 corresponds to the perimeter 35 of the cavity 33. The lower edge or recess 44 is formed on the base surface 41 of the second component or false-male 12 of the mould 10.

The opening 43 is also delimited by an upper edge 45, placed at the upper surface 42 of the second component or false-male 12.

The upper edge 45 is substantially circular and substantially corresponds to the plan conformation of the saddle 20.

The upper edge 45 substantially corresponds to a second perimeter 28 of the edge portion 25 of the saddle 20 (shown in FIGS. 2 and 3). In particular, the second perimeter 28 corresponds to the lower or lowest perimeter of the edge portion 25.

The upper edge 45 has an extension which is lower than the extension of the edge or recess 44.

At the closing line 14 of the mould, between the perimeter 35 of the cavity 33 and the lower edge or recess 44 an annular port 344 can be provided to increase the vacuum draw and make it even more constant and effective, even at the edge portion 25 of the saddle 20.

This annular port 344 is placed around the cavity 33, at the closing line 14 of the mould, at least until it meets the vacuum connectors CV and/or has a height of about 0.1 mm.

The second component or false-male 12 comprises an inner side wall 46 which delimits the lateral and/or upward extension of the through opening 43. The inner side wall 46 is bounded, at the bottom, by the edge or recess 44 and, at the top, by the edge 45.

The inner side part 46 has a conformation substantially corresponding to part of the edge portion 25 of the saddle 20, in particular to the second edge portion 25b of the saddle 20.

Therefore, the slope of the side wall 46 corresponds to the angle of the second edge portion 25b of the edge portion 25. Therefore, considering the plane on which the first stretch 34a of the cavity 33 lies, the side wall 46 has a slope which forms inside, with the first stretch 34a, an acute angle of between 90° and 1° or preferably between 89° and 20° or between 6° and 40°.

The inner side wall 46 has a substantially rectilinear or slightly concave pattern, considered from its lowest part in use to its highest part in use.

The inner side wall 46 is inclined upward towards the inside; therefore, it has, for example, a centripetal pattern moving away from the first component or matrix 13.

The inner side wall 46, therefore, and/or the through opening 43 of the second component or false-male 12, with respect to the shape of the cavity 33 of the third component or matrix 13, cause an undercut in the mould 10. This undercut makes it possible to make an undercut 24 in the support element for the human body and/or in the bicycle saddle 20, at least in the front area or tip (nose) A of the saddle itself or of the support element for the human body, and/or, in general, of a sharp-cornered or angular contour 24 for the same.

Naturally, the slope of the second stretch 34b and/or of the side wall 46 can be constant along their whole extension or can vary from area to area, remaining however, at least according to a version of the invention, within the indicated ranges.

In a further embodiment, the slope indicated for the second stretch 34b and/or for the side wall 46 can only be present in a portion of their perimetric shape (and therefore only at a portion of the edge 25 of the saddle 20, for example its front portion).

Along at least part or the entire inner side wall 46 holes 15 for the vacuum are provided.

At the upper edge 45 a further undercut 47 is positioned, for the trimming of the cover, as will be better described in the continuation of the present discussion. This undercut 47 has a substantially circular shape, projecting towards the inside of the through opening 43 and substantially determines the innermost profile of the saddle 20, along the joining between the cover 21 and/or the padding 22 with the frame or shell 23 of the same saddle.

It is therefore seen that at the further undercut 47 the trimming line 16 is determined while at the perimeter 35 and the edge or recess 44 there is the closing line 14 of the mould. Therefore, with respect to what happens in at least some known moulds, the trimming line of the saddle and the closing line of the mould do not coincide and/or are offset from one another and/or each is carried by a different component of the mould 10.

It can therefore be noted as the final or three-dimensional conformation of the saddle 20, or rather of its cover 21 and its padding 22, is given by the union of the cavity 33 with the through opening 43, hence from the cavity 63. Furthermore, the outer and possibly perimetric surface of the saddle 20 is delimited by the surface of the cavity 33 of the first component or matrix and by the inner side wall 46 of the second component or false-male 12.

As said and as can be seen in the attached figures, the mould 10 according to the present invention may comprise a third component or cover-press 11.

Figure 12:
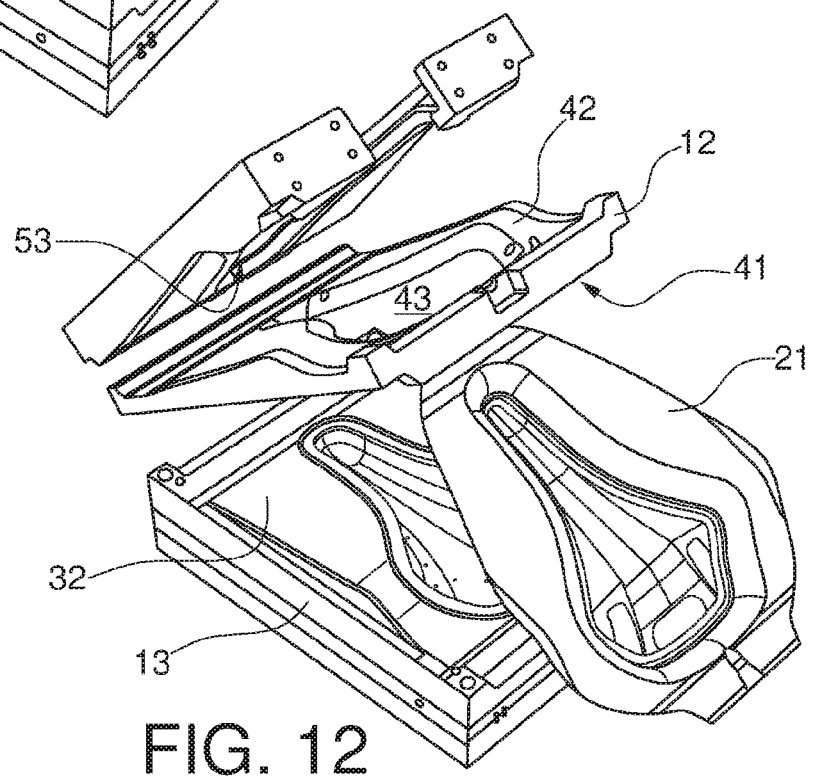
FIG. 12 illustrates a still further process step according to the present invention, in which the support element for the human body obtained with the mould according to the present invention is seen.

The third component or cover-press 11 has a substantially annular plate conformation, provided with a through hole 53 (indicated for example in FIGS. 4 and 12).

The third component or cover-press 11 has a base surface 51 and an upper surface 52, opposed to the base surface 51. The base surface 51 is positioned in contact with the substantially flattened portion of the surface 42 and/or with the upper surface 42 of the second component or false-male 12.

The upper surface 52 is positioned superiorly or more outwardly in use with respect to the base surface 51.

The base surface 51 and/or the upper surface 52 are substantially shaped so as to recreate the final shape of the saddle 20.

The through hole 53 determines an access for the further component or male 60 of the mould 10.

As can be seen, for example, in the section of FIG. 1 or 5, the through hole 53 of the third component or cover-press 11 can delimit an extension or area larger than the extension or area of the through opening 43 of the second component or false-male 12 and/or of the cavity 33 of the first component or matrix 13.

In this case, the peripheral edge 48 of the upper surface 42 of the second component or false-male 12, starting from the undercut 47 for trimming up to the substantially flattened portion thereof, is substantially rounded. The edge 48 faces the inside of the opening 43 of the second component or the false-male 12 or towards the cavity 63.

In this way, it is avoided that sharp or angular edges are created for the cover 21 when the latter is put into use in the mould 10.

Since the third component or cover-press 11 rests in the substantially flattened portion of the upper surface 42, the rounded edge 48 extends substantially from the point of contact between the upper surface 42 and the cover-press 11, to the undercut 47.

In a further embodiment, not shown in the accompanying figures, the through hole 53 defines an extension or area substantially corresponding to or slightly higher than that of the through opening 43 of the second component or false-male 12. In this way, the blocking of the cover 21 (or rather of its edge or perimeter protruding with respect to its central part corresponding substantially in plan to the extension of the through hole 53 and/or of the through opening 43) between the second component or false-male 12 and the third component or cover-press 11 occurs near the upper edge 45 of the through opening 43. Therefore, it is possible to reduce the size of the section of material that constitutes the cover 21 itself, obtaining a saving of the material and of related costs. Naturally, the further component or male 60 will be shaped appropriately, so as to allow its passage through the through hole 53.

As can be appreciated from the accompanying drawing tables, the cavity 33 and the through opening 43 are superimposed on one another, so as to determine a single space (cavity 63), having in negative the conformation of the outer surface, and possibly also of the lateral one, of the support element for the human body or of the bicycle saddle 20.

Also the through hole 53 is superimposed to the through opening 43 and, consequently, on the cavity 33.

Thus, the cavity 33 is coaxial with the through opening 43 and/or with the through hole 53.

When placed on top of each other, the first component or matrix 13, the second component or false-male 12 and the third component or cover-press 11 form a sort of block or parallelepiped having a support base on the ground or on a special support, and at least two lateral faces. The various components of the mould 10 can be opened from a first operating position (for example shown in FIG. 9), in which they are rested on one another, to a second operating position (for example shown in FIG. 12), in which they are each detached from one or more of the other components. Therefore, the various components of the mould 10 may have hinging or moving means, able to allow them to pass from that first operating position to the second and vice versa. Naturally, during this movement, the various components of the mould 10 can assume numerous intermediate positions.

According to an embodiment example, the hinging or moving means can comprise a series of hinges, for example each one being placed in a component and/or between two adjacent components. These hinges can be placed on the same side face of the block or parallelepiped which forms the mould 10 or can be positioned each, or at least one, in a respective face. Naturally, the block of the assembled mould 10 could also have a cylindrical or irregular shape, without thereby departing from the scope of protection of the present invention.

Moreover, in at least one version, the mould 10 may comprise at least one coil or a thermocouple valve in the first component or matrix 13 and/or in the second component or false-male 12 and/or in the further component or male 60, to manage a heating with controlled liquid and regulated by means of a probe, and a relevant electronic display for setting the temperature, in order to achieve a heating of the respective component or of the mould 10, according to the specific processing tasks that with it are carried out. Furthermore, gaskets, not illustrated in the accompanying figures, may be present between the various components.

As can be seen in the series of FIGS. 6 to 12, an operating mode according to which the mould 10 according to the present invention is used can be the following. The mould 10 is initially in an open position, or second operating position. The first component or matrix 13 and the second component or false-male 12 are closed and/or assembled or placed in contact with one another. In this way, the cavity 63 is exposed at the top to allow access to it. During this step, the through opening 43 of the second component or false-male 12 is superimposed on the cavity 33 of the first component or matrix 13, so as to create a single space or cavity 63, open at its top, as illustrated for example in FIG. 7.

During this step, the perimeter 35 of the cavity 33 is in contact with and corresponds to the lower edge or recess 44 of the through opening 43.

Figure 8:
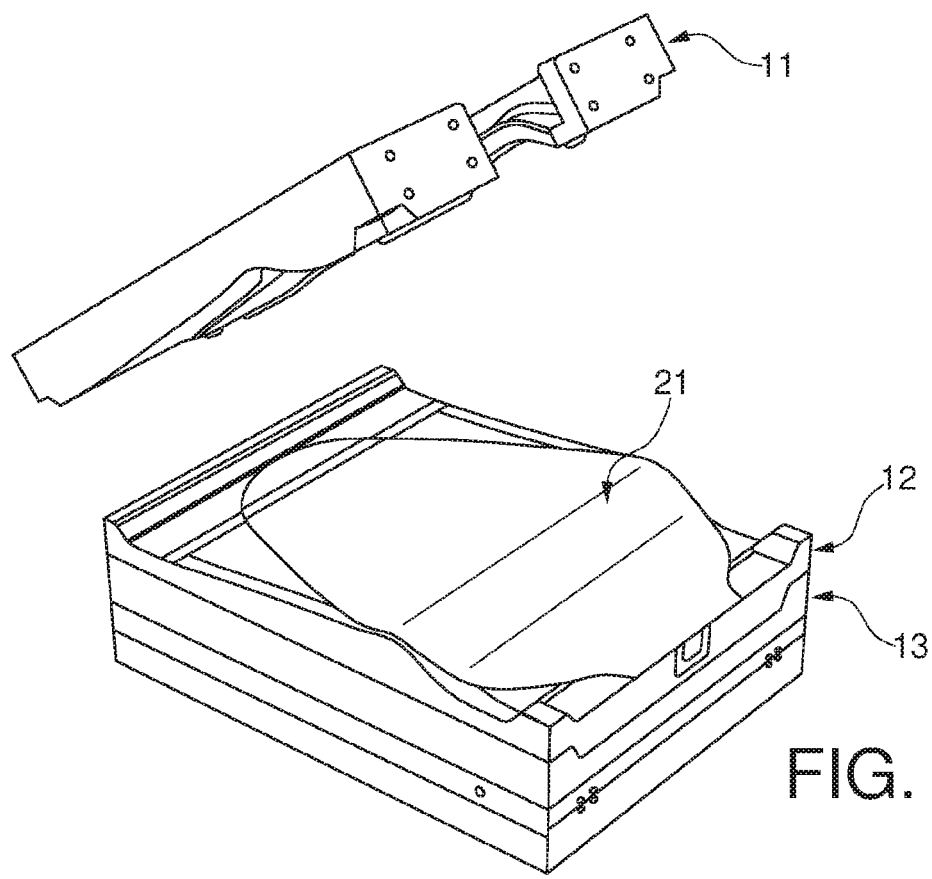

As can be seen in FIG. 8, at the space determined by the cavity 33 and by the through opening 43, a section of the cover 21 is positioned. The section of the cover 21 substantially covers the entire area subtended to the upper edge 45 of the through opening 43.

In this way, the material which constitutes the cover 21 is placed briefly in contact with the upper surface 42 of the second component or false-male 12 and/or with the surface, facing in use towards the top, the cavity 33 and/or of the inner side wall 46 of the second component or false-male 12.

Figure 9:
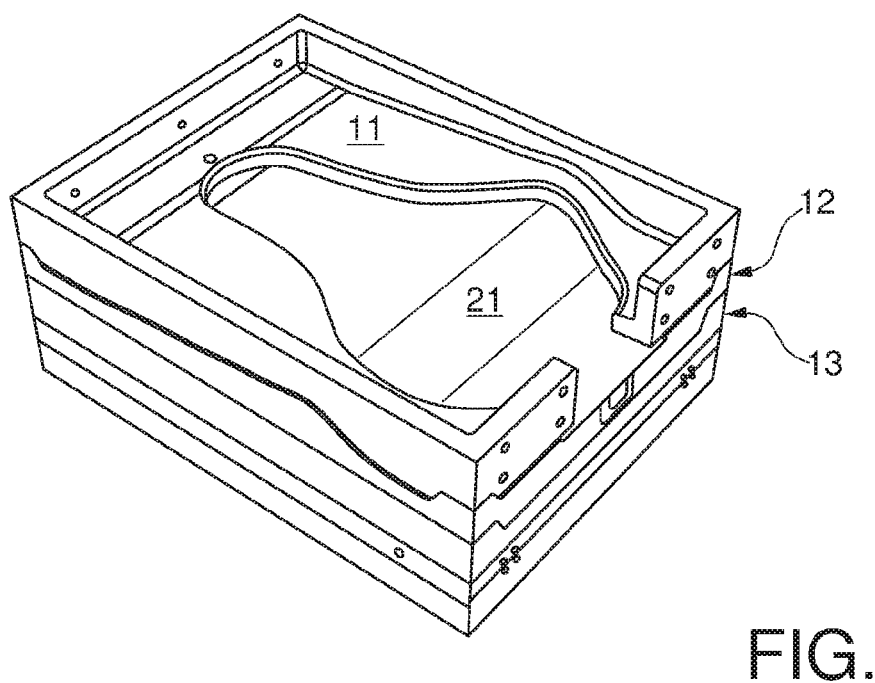
FIG. 9 is a perspective view of the mould of FIG. 6 or of FIG. 8, in which all the components of the mould according to the present invention are assembled on each other, FIG. 10 corresponds to FIG. 9 according to a further process step according to the present invention.

As can be seen in FIG. 9, after positioning the cover 21, the third component or cover-press 11 is closed.

In this way, the through hole 53 of the third component or cover-press 11 is positioned substantially in correspondence with the through opening 43 and/or of the cavity 63, so that the through hole 53 is above the same through opening 43. However, between the second component or false-male 12 and the third component or the cover-press 11, the section of the cover 21 is interposed, which is thus locked in position by these two components, at least for its peripheral edge (corresponding to the portion of the section of the cover 21 exceeding its central part, the central portion having an extension substantially equal to that of the opening 43 and/or the through hole 53). The cover 21, therefore, extends beyond the through hole 53; the section of the cover 21 is, at least in a version of the invention, larger than the through hole 53 so as to be able to be caught for about 3 cm by the false-male 12 and the cover-press 11. Therefore, the amplitude or area delimited by this through hole 53 and/or by this through opening 43, in this process step, is completely occupied by the cover 21. This step is explained in FIGS. 8 and 9.

Then there is a shaping step of the cover 21 along the whole surface which constitutes the cavity 63, i.e. the cavity 33 and the inner side wall 46 of the second component or false-male 12. This step takes place, for example, by operating a vacuum pump and by sucking, through the holes 15 for the vacuum, the air that is found between the mould and the cover 21.

Thanks to the presence of the holes 15 for the vacuum both on the first component or matrix 13 and on the second component or false-male 12, there will be excellent adherence and shaping of the cover 21, as said, both on the first and on the second component of the mould 10. This step is illustrated, for example, in FIG. 10.

Naturally, the surface of the cover 21 which, in use, will come into contact with the user of the bicycle saddle, is in this embodiment step in contact with the surface of the cavity 33 and of the side wall 46. Therefore, with the shaping, a configuration similar to that determined by the space of the cavity 33 and of the through opening 43, that is to say then of the cavity 63, will be recreated.

Figure 10:
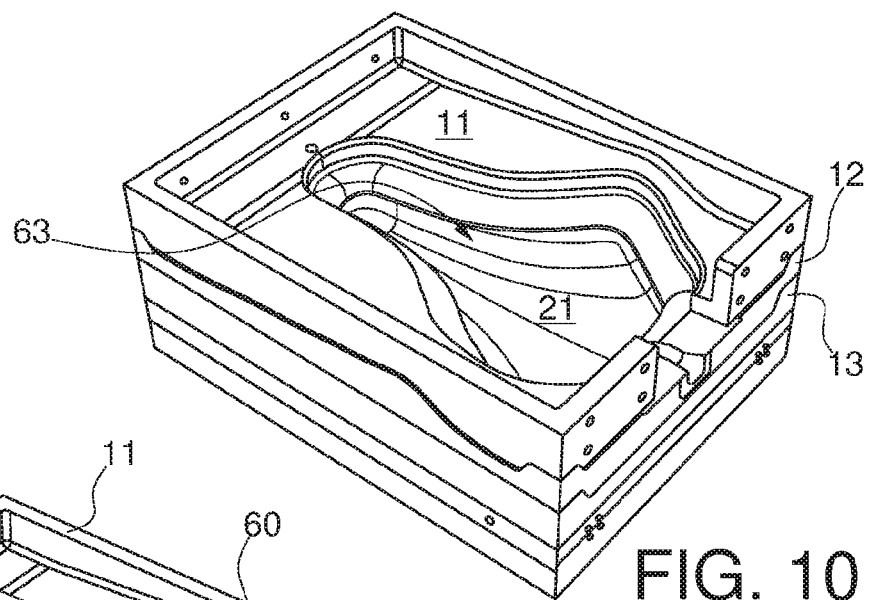

A step is then taken to prepare the padding 22, as shown in FIG. 10. This step of preparing the padding 22, according to an embodiment, takes place by positioning or casting, on the duly conformed cover 21, of the material or materials which make the padding itself.

According to a further version, this step is carried out by casting on the duly shaped cover 21 a material of the type of the polyurethane foam or a material capable of expanding.

Figure 11:
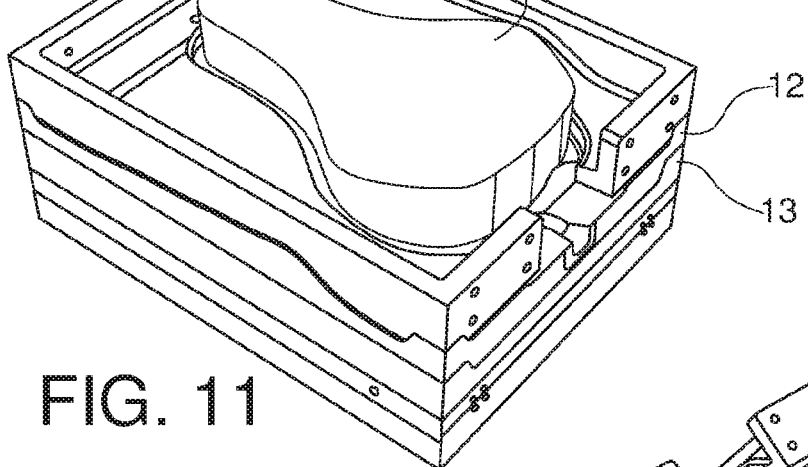
FIG. 11 shows a perspective view of the mould of FIG. 10 provided with a further component or male of the mould according to the present invention.

A closing step of the cavity then takes place with the further component or male 60, as shown in FIG. 11.

The step of preparing the padding 22 comprises a step of positioning at least one material of the padding 22 over the shaped section of the cover 21, and/or casting or injecting the at least one material suitable for making the padding 22 in the space included between the shaped section of the cover 21 and the further component or male 60 (which in this case has already been positioned above the third component or the cover-press 11 as will be better explained below), expand at least one of the one or more materials suitable for making a padding 22, and/or waiting a certain time before opening the mould 10, and/or connecting or making adhere the at least one material of the padding 22 to the material of the section of the cover 21, such that the step of arranging means that the at least one material of the padding 22 will substantially fill the whole space determined by the cavity 63. In this way the forming or preparation of the padding 22 is obtained.

This further component or male 60 is shaped so as to be able to carry or to reproduce the conformation of the frame or shell of the saddle 20.

Therefore, in a first version, the further component or male 60 will have a lower surface, suitable during use to face the cavity 33, 63, suitably shaped to house a frame or shell 23 of the saddle 20. For example, the surface of the frame or shell 23 which in use is not visible to the user, as intended to be bound to the padding 22, will be the one that will remain visible once the same is connected to the further component or male 60. That is to say, the surface of the frame or shell 23 which in use is directed towards the bicycle frame will be that which will be in contact with the lower surface of the further component or male 60.

The coupling of the frame or shell 23 on the male 60 is of a removable or reversible type.

In a further version, the lower surface of the further component or male 60 is shaped in such a way as to reproduce, in the padding 22 (once the latter has been formed), an impression which can be subsequently constrained to a frame or shell 23 of a bicycle saddle or, in general, of a support element for the human body.

If the frame or shell 23 is to be constrained or loaded on the further component or-male 60, this operation is carried out before the mould 10 is closed by such component.

Once the mould 10 is closed, in the space corresponding to the cavity 33 and the through opening 43, for example, the expansion of the polyurethane foam or of the expanding material takes place, until this occupies all the available space of the cavity 63, reproducing its conformation.

During this step of foaming or expanding, for example, the mould 10 and/or the further component or male 60 and/or one of the components 11, 12 or 13 can be heated and/or cooled.

In a still further version, after having shaped the cover 21, it is performed the closing step of the mould 10 with the further component or male 60 and, as a result of this, an injection or insertion step of the material constituting the padding 22 in at least part of the space determined by the cavity 33 and by the through opening 43.

A waiting step then takes place, during which the forming and/or expansion of the material that constitutes the padding 22 takes place.

Once the whole is ready, the mould is opened and the saddle 20 or the support element for the human body, which is in a moulded state but not yet completed, is extracted.

To extract the saddle 20, after its formation, it is necessary to open both the third component or the cover-press 11, so as to release the cover blocked by it, and the second component or false-male 12. In fact, since the false-male 12 comprises an inner side wall 46 tilted towards the inside of the through opening 43 and, possibly, an undercut 47 for trimming, it would not be possible to extract the saddle if the second component or false-male 12 was not released from the first component or matrix 13. Therefore, the extraction of the saddle 20 after its forming takes place thanks to the at least partial spacing of the second component 12 with respect to the matrix 13. In fact, the padding 22 has an angular or undercut shape, corresponding to the surface of the cavity 63, and therefore of the cavity 33 and the through opening 43.

In this way, as mentioned, it is possible to realize a specific conformation and specific angular designs along the profile or edge 25 of the saddle 20 and any further undercuts at the saddle nose.

Then follows a step, in case of need, of application or gluing of the frame or shell 23 in the impression determined by the further component or male 60.

Finally, there is a trimming step of the material in excess of the section of the cover which occurs along the trimming edge 16, possibly determined by the further undercut 47.

The trimming occurs substantially along the perimeter of the frame or shell 23, so that the cover 21 has a perimetric end adherent or in contact with the frame or shell 23 or at least with its outermost edge.

A finished saddle 20 or a finished support element for the human body is thus obtained.

In this way, it is possible to understand how the opening line of the mould 14, i.e. the separation line of the second component or false-male 12 from the first component or matrix 13 does not correspond to the trimming line 16 of the cover, as instead occurred with the mould of FIGS. 1 and 5.

Therefore, the mould opening line is positioned at the change in slope of the outer surface of the support element for the human body, in particular when such a change in slope is from an obtuse slope or angle to an acute slope or angle and vice versa. It is therefore understood that in case of support elements for the human body having complex conformations, there may also be two or more second components or false-males, each delimiting a lower edge or recess at the slope change line of the outer surface of the support element for the human body, and therefore each lower edge or recess delimits a corresponding opening line of the mould.

As will be understood, the present invention ensures an improvement with respect to the current solutions, since the resulting support element can also be formed with complex conformations, without complicating the respective manufacturing process or the mould that can be used for the purpose.

As can be seen, in at least one version of the invention, it is possible to obtain the support element for the human body with a single processing step or with a single mould, without having to move the semi-finished element from a mould to a second mould different from the first.

Furthermore, the undercut 47 for trimming ensures a high level of finish of the support element for the human body, even in its lower part during use. This undercut 47 for trimming, moreover, causes a folding of the cover 21 which, in this way, perfectly adheres to the padding 22, increasing the quality of the finished product.

Modifications and variations of the invention are possible within the scope of protection defined by the claims.

Furthermore, the features described for one embodiment of the invention may also be present in other embodiments described herein, without thereby departing from the scope of protection conferred by the present invention.

Further, all the details can be replaced by other technically equivalent elements. In practice, the materials employed, as well as the contingent shapes and dimensions, may be any according to requirements without thereby abandoning the scope of protection of the following claims.

The invention claimed is:

1. A mould for making an element for supporting the human body, including a saddle for a bicycle or for a motorcycle, wherein said mould comprises a first component or matrix, which is provided with a cavity open at the top, and at least one second component or false-male, wherein said second component or false-male has a through opening, a base surface and an upper surface, opposite the base surface, and comprises an inner side wall which delimits said through opening, wherein said cavity of said first component or matrix and said through opening of said second component or false-male determine a joined cavity, wherein said joined cavity has a shape corresponding during use to the shape and/or bulk and/or external surface of said element for supporting the human body, wherein said inner side wall of said second component or false-male comprises a lower edge or groove corresponding to a perimeter of said joined cavity, and an upper edge at said upper surface, wherein said inner side wall of the second component or false-male provides a first undercut in the mould with respect to the shape of said cavity of said first component or matrix, wherein the first undercut projects towards an interior of the joined cavity, and wherein at said upper edge of said inner side wall, a second undercut is formed, wherein said second undercut has a substantially continuous outer edge comprising one or more curved portions, wherein said second undercut projects further towards the interior of said joined cavity than the first undercut.

2. The mould according to claim 1, wherein said cavity of the first component or matrix has a shape adapted to reproduce part of the external surface of the element for supporting the human body, wherein said part of the external surface of the element for supporting the human body corresponds with the shape of an upper surface of the element for supporting the human body and with at least part of an edge portion of said element for supporting the human body.

3. The mould according to claim 1, wherein said first component or matrix has a substantially continuous plate-like shape, provided with a base surface and an upper surface, opposite said base surface, wherein said upper surface has a peripheral portion with substantially flattened shape and has, in a central part thereof, a recessed surface shaped so as to determine said cavity of the first component or matrix.

4. The mould according to claim 1, wherein said cavity of the first component or matrix has an internal surface constituted by a first stretch, having a substantially continuous outer edge including one or more curved portions and central of said cavity of the first component or matrix, and a second stretch, wherein said second stretch is extended radially along the perimeter of the first stretch, moving away from the latter and/or wherein said second stretch is projected upward towards the exterior of the mould and/or of the cavity of the first component or matrix, and/or wherein said second stretch connects said first stretch and a peripheral portion of an upper surface of said first component or matrix by means of a first perimeter.

5. The mould according to claim 1, wherein said second component or false-male is substantially plate shaped, and wherein said base surface is adapted to be positioned, during use, in contact with a substantially flattened peripheral portion of an upper surface of the first component or matrix and/or wherein said through opening is adapted to be positioned during use at the top of said cavity of the first component or matrix.

6. The mould according to claim 5, wherein said inner side wall is tilted at the top towards the interior of said through opening and/or wherein the tilt of said inner side wall is opposite with respect to a tilt of a second stretch of said cavity of the first component or matrix.

7. The mould according to claim 1, wherein said mould comprises holes for vacuum present both in said first component or matrix and in said at least one second component or false-male.

8. The mould according to claim 1, wherein said mould comprises a third component or cover-press, wherein said third component or cover-press is substantially plate shaped provided with a base surface, an upper surface, opposite the base surface, and with a through hole, wherein said base surface is positioned during use in contact with a substantially flattened portion of the upper surface of said second component or false-male.

9. The mould according to claim 1, wherein said mould comprises a further component or male, adapted to close, during use, an upper inlet opening of said joined cavity and/or adapted during use to access the joined cavity through a through hole and/or wherein said through hole is adapted during use to be superimposed on the joined cavity and/or on the through opening and, consequently, on the cavity of the first component or matrix.

10. The mould according to claim 1, wherein said first component or matrix and said second component or false-male are coupled on top of each other according to a first operating position and can be separated from each other according to a second operating position, and/or wherein hinging or moving means are present that are adapted to separate at least said second component or false-male from said first component or matrix.

* * * * *